(12) United States Patent
Jeong et al.

(10) Patent No.: US 11,604,268 B2
(45) Date of Patent: Mar. 14, 2023

(54) APPARATUS OF MULTIPLE TARGETS MANAGEMENT FOR MULTISTATIC PCL BASED TARGET LOCALIZATION

(71) Applicant: AGENCY FOR DEFENSE DEVELOPMENT, Daejeon (KR)

(72) Inventors: Inhwan Jeong, Daejeon (KR); Sanhae Kim, Daejeon (KR); Kyuha Song, Daejeon (KR); Junil Ahn, Daejeon (KR); Hyungyu Kwak, Daejeon (KR); Jonghwan Lee, Daejeon (KR); Sanghun Im, Seongnam-si (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 141 days.

(21) Appl. No.: 17/159,603

(22) Filed: Jan. 27, 2021

(65) Prior Publication Data

US 2021/0318425 A1   Oct. 14, 2021

(30) Foreign Application Priority Data

Mar. 6, 2020   (KR) .......................... 10-2020-0028547

(51) Int. Cl.
*G01S 13/72* (2006.01)
*G01S 13/87* (2006.01)
*G01S 13/00* (2006.01)

(52) U.S. Cl.
CPC .......... *G01S 13/726* (2013.01); *G01S 13/003* (2013.01); *G01S 13/878* (2013.01)

(58) Field of Classification Search
CPC ..... G01S 13/003; G01S 13/726; G01S 13/878
See application file for complete search history.

(56) References Cited

U.S. PATENT DOCUMENTS

2003/0085840 A1\* 5/2003 Benner .................. G01S 7/285
                                              342/450
2004/0075605 A1\* 4/2004 Bradford ............... G01S 13/878
                                              342/96
2008/0088508 A1\* 4/2008 Smith .................. G01S 13/878
                                              342/453

FOREIGN PATENT DOCUMENTS

KR   10-2015-0094240 A   8/2015
KR       10-1733035 B1   5/2017

OTHER PUBLICATIONS

Jeong et al., "Localization Performance Analysis of Multistatic PCL System Based on FDOA", The Journal of Korean Institute of Electromagnetic Enginering and Science, vol. 31, No. pp. 26-32 (Jan. 2020).

\* cited by examiner

*Primary Examiner* — Timothy X Pham
(74) *Attorney, Agent, or Firm* — Knobbe, Martens, Olson & Bear, LLP

(57) ABSTRACT

This application relates to a passive coherent location (PCL) system. In one aspect, the PCL system includes a signal measurement device configured to receive a plurality of signals from a plurality of illuminators and generate an In-phase signal and a Quadrature signal corresponding to each illuminator using the received signals. The PCL system also includes a signal processing device configured to detect a first target using the In-phase and Quadrature signals and measure a bistatic range of the first target and a bistatic velocity of the first target to generate a plurality of pieces of line track information corresponding to the first target. The PCL system further includes a locating device configured to generate target track information of the first target using the line track information and predict a position vector and a (Continued)

velocity vector of the first target using the target track information.

14 Claims, 4 Drawing Sheets

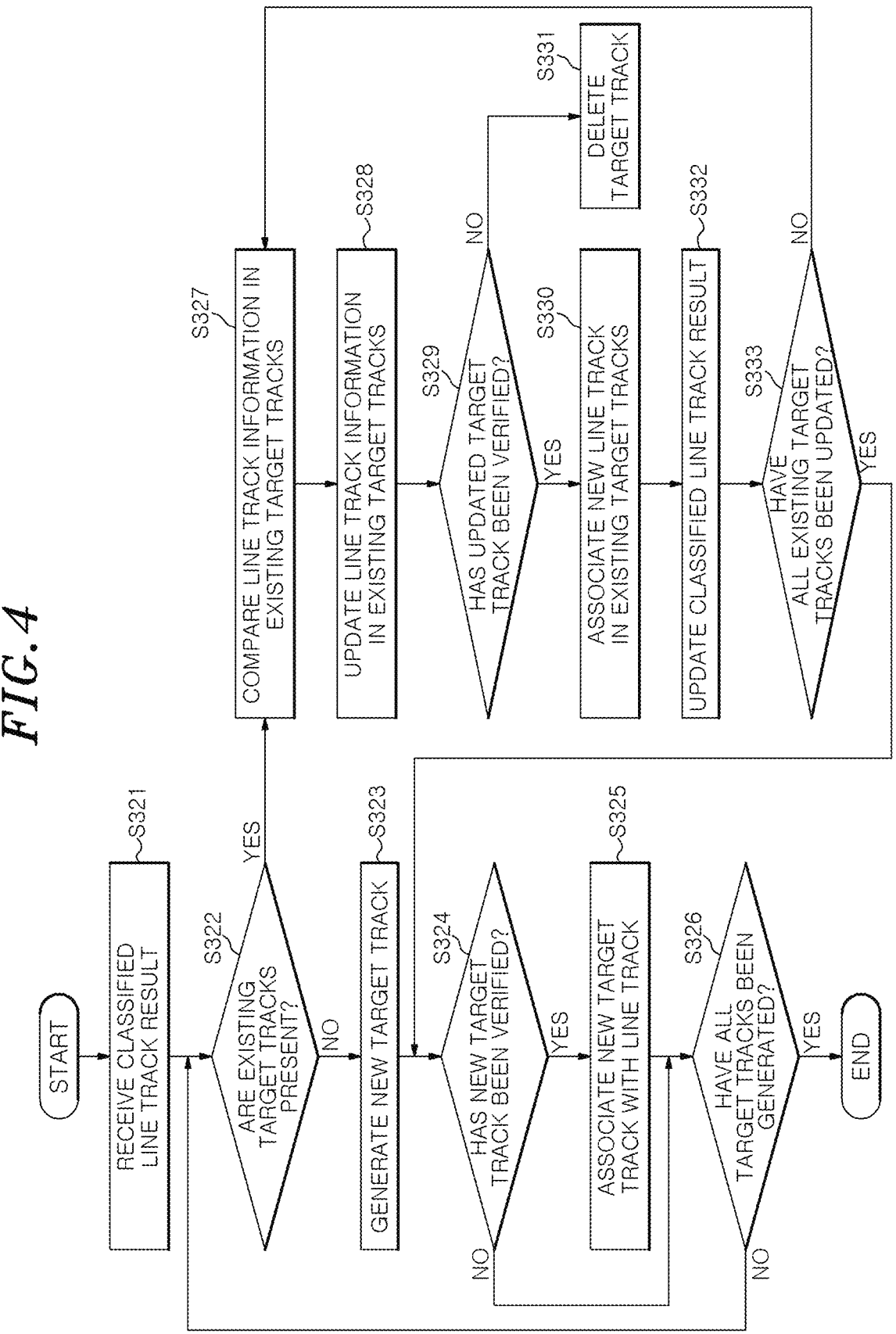

APPARATUS OF MULTIPLE TARGETS MANAGEMENT FOR MULTISTATIC PCL BASED TARGET LOCALIZATION

CROSS-REFERENCE TO RELATED APPLICATION

This application claims priority to Korean Patent Application No. 10-2020-0028547, filed on Mar. 6, 2020. The entire contents of the application on which the priority is based are incorporated herein by reference.

BACKGROUND

Technical Field

Embodiments relates to a multistatic passive coherent location (PCL) system, and more specifically, a multistatic PCL based target localization technique for efficiently managing a plurality of targets.

Description of Related Technology

A multistatic PCL system is a system that acquires a bistatic range and bistatic velocity information by estimating time differences of arrival (TDOA) and frequency differences of arrival (FDOA) between reference signals directly received from signals radiated from a plurality of illuminators and target echo signals reflected from moving targets and received and associates the bistatic range and bistatic velocity with a specific target.

SUMMARY

A multiple targets management apparatus for multistatic PCL based target localization according to embodiments provides an apparatus for efficiently generating and managing a target track by associating a plurality of bistatic information measurement values corresponding to a plurality of targets with the respective targets and assigning unique numbers of the targets thereto.

The signal measurement device comprises an antenna array configured to receive the plurality of signals, a plurality of signal measurement units configured to generate the In-phase signal and the Quadrature signal corresponding to each of the plurality of illuminators using the plurality of received signals.

The signal processing device may include a plurality of signal processors corresponding to the plurality of illuminators, the signal processors manage the plurality of pieces of line track information.

The locating device may include a line track information combiner configured to classify the plurality pieces of line track information based on the plurality of illuminators, a multiple target association unit configured to manage the target track information using the classified line track information, a position and velocity predictor configured to predict a position and a velocity of the first target using the target track information.

The multiple target association unit may generate a plurality of combinations by combining a plurality of pieces of line track information associated with the first target from among the plurality pieces of classified line track information when there is no target track information being managed, calculates reliability values indicating whether the plurality of combinations is information about the first target, and generates the target track information using a combination corresponding to a highest reliability value from among a plurality of reliability values corresponding to the plurality of combinations.

The information about the first target include the bistatic range of the first target and the bistatic velocity of the first target.

The multiple target association unit may associate the target track information with information of the combination corresponding to the highest reliability value when the reliability values are greater than a predetermined threshold value.

The multiple target association unit may generate new target track information using line track information other than line track information associated with the target track information from among the classified line track information.

When the target track information being managed is present, the multiple target association unit compares line track information corresponding to the target track at a first time with the plurality of pieces of line track information at a second time, and when corresponding line track information is present, updates target track information at the second time using the corresponding line track information, the first time is prior to the second time, and the first time and the second time are repeated at specific intervals.

The multiple target association unit may compare a position vector of the first target and a velocity vector of the first target at a fourth time, predicted at a third time, with a position vector of the first target and a velocity vector of the first target, measured at the fourth time, and checks whether the first target predicted at the third time is the same as the first target measured at the fourth time, wherein a position vector of a first target and a velocity vector of the first target at the third time are predicted using the target track information, wherein a position vector of a first target and a velocity vector of the first target at the fourth time are calculated using line track information used to update the target track information, and wherein the third time is prior to the fourth time, and the third time and the fourth time are repeated at specific intervals.

When the first target predicted at the third time is not the same as the first target measured at the fourth time, the multiple target association unit deletes corresponding target track information.

The multiple target association unit may associate a target track at the third time with a plurality of pieces of line track information corresponding to the first target at the fourth time when the first target predicted at the third time is the same as the first target measured at the fourth time.

When the target track managed at the first time may be updated, the multiple target association unit deletes line track information associated with the target track from among the classified line track information and generates target track information using remaining line track information.

When the target track managed at the first time is not updated, the multiple target association unit compares line track information corresponding to the target track at the first time with the plurality of pieces of line track information at the second time, and when corresponding line track information is present, updates target track information at the second time using the corresponding line track information.

The multiple target association unit may store the target track information as a structure.

BRIEF DESCRIPTION OF THE DRAWINGS

FIG. 4 is a flowchart illustrating an operating method of multiple target association unit according to an embodiment.

DETAILED DESCRIPTION

When a plurality of targets are present within a detectable range, there are also a plurality of bistatic range measurement values and bistatic velocity measurement values acquired by processing signals received from a plurality of illuminators. Accordingly, a process of maintaining a target track for estimating the position of a target and continuously maintaining the position corresponding to the target in association with combinations of measurement values caused by the specific target from among a plurality of bistatic measurement values and bistatic velocity measurement values for individual illuminators is required. Here, if the number of illuminators used in a multistatic PCL system at a specific timing is M and the number of actual targets in a detection area is K, the number of cases of combinations that need to be searched in order to find a combination of a bistatic range measurement value and a bistatic velocity measurement values caused by a specific target is $K^M$. Since computational load may considerably increase as the number M of illuminators and the number K of targets increase, real-time operation of the system can be interfered. Furthermore, there are need for efficient methods of associating bistatic range/velocity measurement values newly measured over time with a target track being maintained or generating a new target track.

Hereinafter, a multistatic passive coherent location (PCL) system will be described with reference to FIG. 1.

Figure 1:
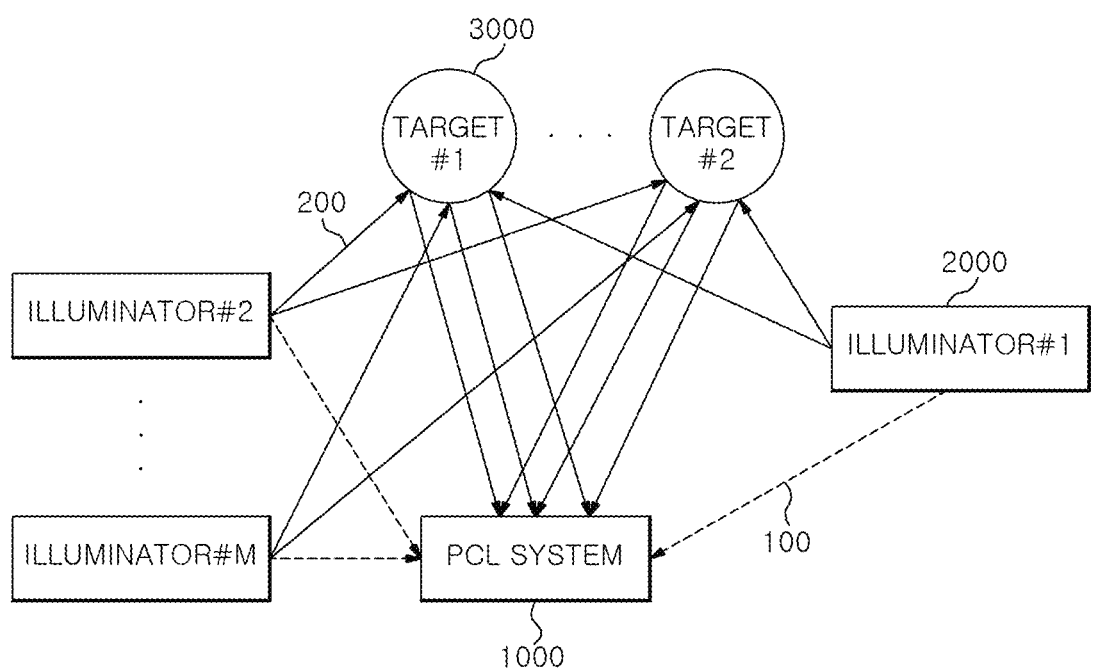
FIG. 1 is a schematic diagram of a multistatic PCL system according to an embodiment.

FIG. 1 is a schematic diagram of the multistatic PCL system according to an embodiment.

Referring to FIG. 1, the multistatic PCL system 1000 is a system that estimates and tracks positions of a plurality of targets 3000 using reference signals 100 radiated from M illuminators 2000 and target echo signals 200 reflected from K targets 3000.

The multistatic system 1000 may measure the reference signals 100 radiated from the plurality of illuminators 2000 and received through lines of sight (LOS) between the illuminators. The multistatic PCL system 1000 may receive the target echo signals 200 in which signals radiated from the plurality of illuminators 2000 are reflected by the plurality of targets 3000.

The plurality of illuminators 2000 may be present at different positions. The multistatic PCL system 1000 according to the embodiment may solve a frequency overlap problem by setting different frequencies for the illuminators. Further, the plurality of illuminators 2000 may be transmission stations with respect to broadcast signals.

A broadcast transmission station may be at least one of an FM radio, digital audio broadcasting (DAB) and digital video broadcasting-terrestrial (DVB_T), but embodiments are not limited thereto.

Hereinafter, a configuration of the multistatic PCL system will be described with reference to FIG. 2.

Figure 2:
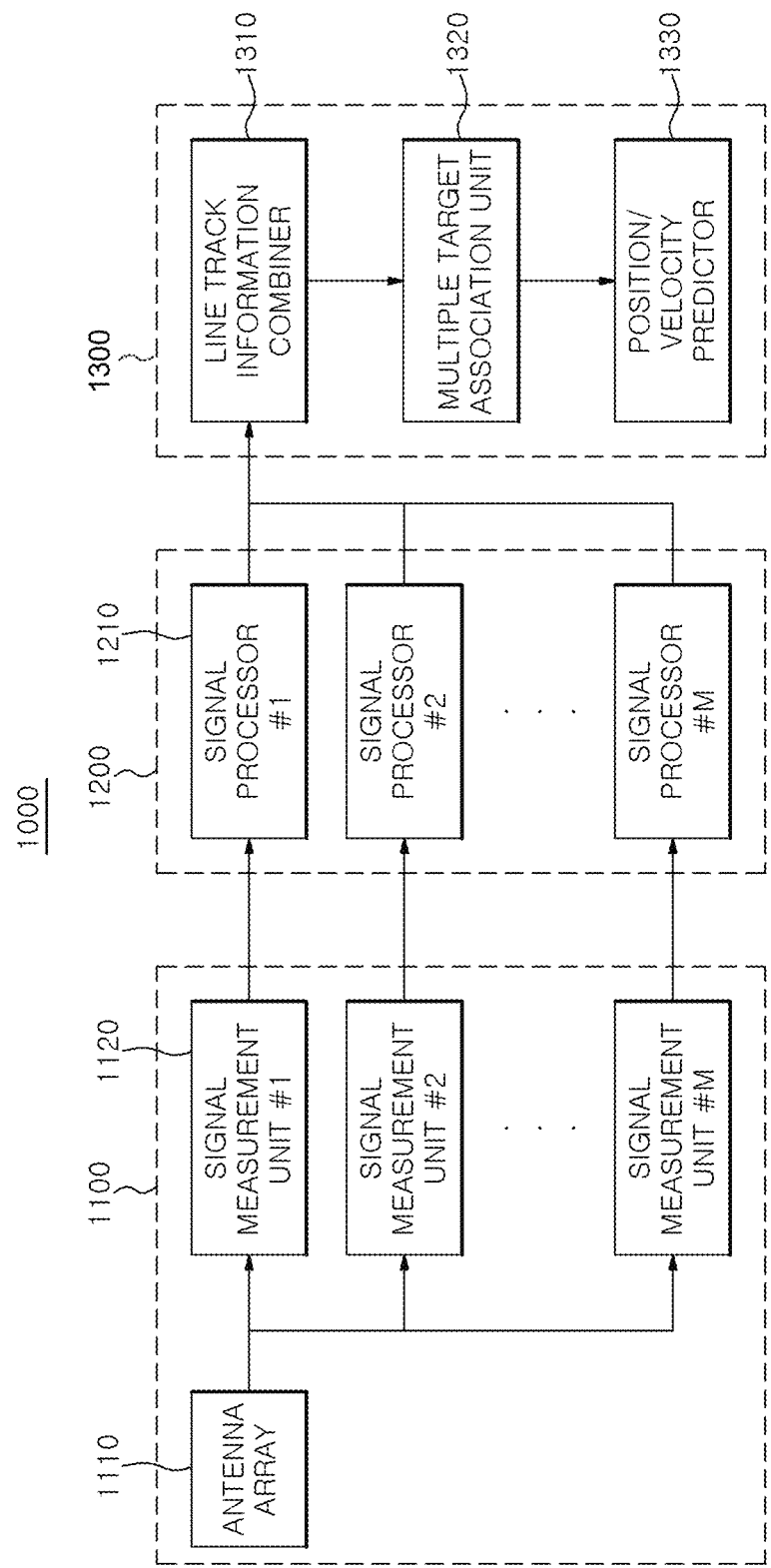
FIG. 2 is a block diagram illustrating a configuration of the multistatic PCL system according to an embodiment.

FIG. 2 is a block diagram illustrating a configuration of the multistatic PCL system according to the embodiment.

Referring to FIG. 2, the multistatic PCL system 1000 includes a signal measurement device 1100, a signal processing device 1200, and a locating device 1300.

The signal measurement device 1100 is composed of an antenna array 1110 and a plurality of signal measurement units 1120 that divides and measures a received signal using the antenna array 1110.

The antenna array 1110 may be composed of a plurality of antenna elements installed in a specific arrangement to receive radio frequency (RF) signals transmitted from M illuminators 2000.

For example, the M signal measurement units 1120 each receives N RF signals input from N antenna elements constituting the antenna array 1110. The M signal measurement units 1120 may perform band pass filtering for removing signal components other than frequency bands defined by wireless broadcast services, provided by the M illuminators, on the received signals and amplify the filtered signals using a low-noise amplifier.

The signal measurement units 1120 may generate N In-phase signals and N Quadrature signals for each illuminator 2000 using the amplified signals, frequency conversion and analog-digital converter (ADC) operation.

The signal processing device 1200 may be composed of M signal processors 1210 and process electronic information collected from the M signal measurement units 1120 in a distributed manner. The M signal processors 1210 receive In-phase signals and Quadrature signals from the M signal measurement units 1120 to detect a plurality of targets 3000. The M signal processors 1210 may measure bistatic ranges and bistatic velocities of the detected targets to manage a plurality of pieces of line track information.

The locating device 1300 includes a line track information combiner 1310, multiple target association unit 1320, and a position and velocity predictor 1330.

The line track information combiner 1310 classifies a plurality of pieces of line track information generated from the signal processing device 1200 based on the M illuminators 2000. The classified line track information is transmitted to the multiple target association unit 1320.

The multiple target association unit 120 manages a target track using the classified line track information. The position and velocity predictor 1330 predicts position vectors and velocity vectors of the plurality of targets 3000 using each piece of target track information.

Hereinafter, a configuration of the signal processor 1210 and an operation method of the line track information combiner will be described with reference to FIG. 3.

Figure 3:
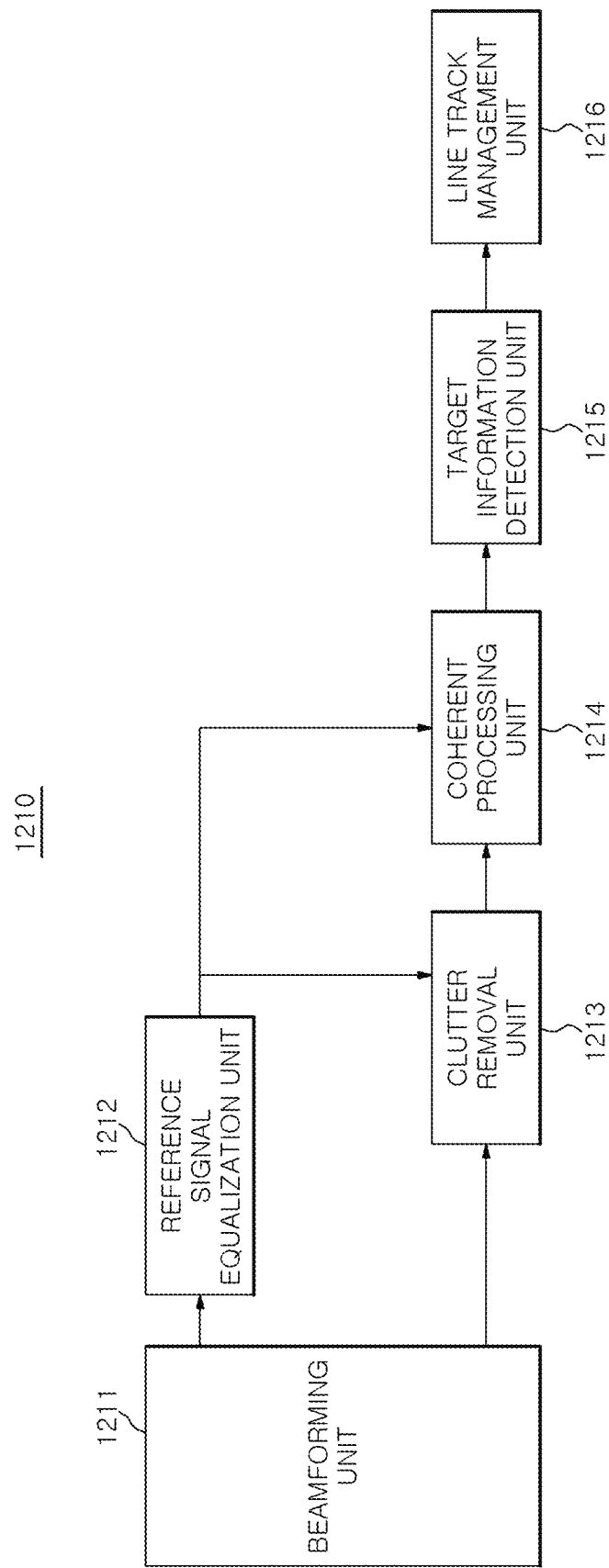
FIG. 3 is a block diagram illustrating a configuration of a signal processor according to an embodiment.

FIG. 3 is a block diagram illustrating the configuration of the signal processor 1210 according to an embodiment.

Referring to FIG. 3, the signal processor 1210 includes a beamforming unit 1211, a reference signal equalization unit 1212, a clutter removal unit 1213, a coherent processing unit 1214, a target information detection unit 1215, and a line track management unit 1216.

The beamforming unit 1211 separates the reference signals 100 from the target echo signals 200 through digital beamforming. The reference signal equalization unit 1212 removes interference signals from the reference signals 100.

The cutter removal unit 1213 removes interference signals from the target echo signals 200 using the interference signals removed from the reference signals 100 by the reference signal equalization unit 1212. The coherent processing unit 1214 detects targets from the target echo signals 200.

The target information detection unit 1215 measures bistatic ranges and bistatic velocities from the detected targets. The line track management unit 1216 manages ling track information using bistatic ranges and bistatic velocities corresponding to the targets of the illuminators. The line track management unit 1216 sequentially assigns line track numbers and line track IDs to the measured bistatic ranges and bistatic velocities.

Bistatic range information $b_R(s,r)$ is represented by the sum of a distance between a target and a illuminator and a distance between the target and the PCL system as shown in FORMULA 1.

$$b_R(s,r) = \|x_t[r] - x_{t_s}\| + \|x_t[r]\| \quad \text{[FORMULA 1]}$$

When the coordinates of the multistatic PCL system 1000 is based on the origin, a 3-dimensional position coordinate vector of a target corresponding to a line track number r is $x_t[r]$, and $x_{t_s}$ represents the position coordinate vector of an S-th illuminator.

The bistatic range information $\hat{b}_R(s,r)$ measured in the multistatic PCL system 1000 is measured in the form as represented by FORMULA 2.

$$\hat{b}_R(s,r) = b_R(s,r) + n_R(s,r), \ n_R(s,r) \sim N(0, \sigma^2_R) \quad \text{[FORMULA 2]}$$

Here, $n_R(s,r)$ represents noise. Accordingly, the bistatic range information measured in the multistatic PCL system 1000 is measured in the form of the sum of the bistatic range information $b_R(s,r)$ of FORMULA 1 and noise.

In FORMULA 2, the index pair (s,r) represents an r-th bistatic range measurement value estimated from an S-th transmission signal. Although it is assumed that a noise distribution follows the Gaussian distribution, the average is 0, and variance is $\sigma^2_R$ in the embodiment, embodiments are not limited thereto and are applicable to various noise distributions.

In addition, bistatic velocity information $b_V(s,r)$ is represented by the sum of a Doppler component between a target and a illuminator and a Doppler component between the target and the multistatic PCL system 1000 as shown in FORMULA 3.

$$b_1(s,r) = \frac{1}{\|x_t[r] - x_{t_s}\|} ((x_t[r] - x_{t_s})T_{v_t}[r]) + \frac{1}{\|x_t[r]\|}(x_t^T[r]v_t[r]) \quad \text{[FORMULA 3]}$$

Here, $v_t[r]$ represents a 3-dimensional velocity vector of a target corresponding to a line track number r when the coordinates of the multistatic PCL system 1000 are based on the origin.

The bistatic velocity information $\hat{b}_V(s,r)$ measured in the multistatic PCL system 1000 is measured in the form as represented by FORMULA 4.

$$\hat{b}_V(s,r) = b_V(s,r) + n_V(s,r), \ n_V(s,r) \sim N(0, \sigma_V^2) \quad \text{[FORMULA 4]}$$

Here, $n_V(s,r)$ represents noise. Accordingly, the bistatic velocity information measured in the multistatic PCL system 1000 is measured in the form of the sum of the bistatic velocity information $b_V(s,r)$ of FORMULA 3 and noise.

In FORMULA 4, the index pair (s,r) represents an r-th bistatic velocity measurement value estimated from an S-th transmission signal. Although it is assumed that a noise distribution follows the Gaussian distribution, the average is 0, and variance is $\sigma_V^2$ in the embodiment, embodiments are not limited thereto and are applicable to various noise distributions.

The line track management unit 1216 stores information as shown in Table 1 on the basis of a bistatic range and a bistatic velocity estimated by the S-th signal processor 1210.

TABLE 1

| r | Line track ID ID(s, r) | $\hat{b}_R$(s, r) | $\hat{b}_V$(s, r) | State | Number of line tracks |
|---|---|---|---|---|---|
| 1 | ID(1, 1) = 1 | $\hat{b}_R$(s, 1) | $\hat{b}_V$(s, 1) | Updated track | $k_s$ |
| 2 | ID(1, 2) = 3 | $\hat{b}_R$(s, 2) | $\hat{b}_V$(s, 2) | Updated track | |
| 3 | ID(1, 3) = 4 | — | — | Deletion candidate track | |
| . | . | . | . | . | |
| . | . | . | . | . | |
| . | . | . | . | . | |
| $k_s$ | ID(1, $k_s$) = 20 | $\hat{b}_R$(s, $k_s$) | $\hat{b}_V$(s, $k_s$) | New track | |

Table 1 shows an example of line track information management of the S-th illuminator. r represents a line track number, and state represents whether line track information is a new track, an updated track or a deletion candidate track. The number of line tracks represents a total number of line tracks managed by the line track management unit 1216.

To manage line track information, the line track management unit 1216 compares line track information corresponding to a target at a first time with a bistatic velocity with a bistatic range corresponding to a target at a second time and a bistatic velocity corresponding to the target.

When the number of line tracks maintained at the second time is $k_s$, the line track management unit 1216 compares bistatic range and bistatic velocity information corresponding to the target detected at the second time with line track information stored at the first time and determines whether the tracks are the same track. Here, the first time is prior to the second time, and the first time and the second time are repeated at specific intervals.

The line track management unit 1216 determines whether tracks are the same track using Euclidean distance comparison according to a detection area and an object target moving velocity of the multistatic PCL system 1000.

In the tracks are the same track, the line track management unit 1216 updates line track information corresponding to a corresponding line track ID to bistatic range and bistatic velocity information of the second time. When the tracks are not the same track, the line track management unit 1216 generates new line track information using bistatic range and bistatic velocity information of the second time.

In addition, when line track information during maintenance is not updated, the corresponding line track is managed as a deletion candidate track, and when it is not updated for a specific time or longer, it may be deleted.

Since a specific target is likely to be undetected due to radar cross section (RCS) characteristic of the target and signal intensity reduction caused by a bistatic range, and mis-detection due to the influence of interference signals such as clutter is also likely to occur, $k_s$ may be different from the number K of actual targets in a detection area when actual restrictions are applied.

Accordingly, if the number of line tracks that are detected as targets and maintained is $k_s$, $k_s$=K−a+b when the number of undetected targets is a and the number of mis-detected targets is b.

The signal processing device 1200 periodically stores line track information in the format as represented by Table 1, the stored line track information is delivered to the line track information combiner 1310 of the locating device 1300.

The line track information combiner 1310 classifies M pieces of line track information generated from the signal processing device 1200 based on the plurality of illuminators 2000 and stores the same in the formats as shown in Tables 2, 3, 4, 5 and 6 below.

TABLE 2

| illuminator index S | Number of line tracks $k_s$ |
| --- | --- |
| 1 | $k_1$ |
| 2 | $k_2$ |
| 3 | $k_3$ |
| . | . |
| . | . |
| . | . |
| M | $k_M$ |

Table 2 shows an example of the number $k_s$ of line tracks managed for each illuminator.

TABLE 3

| rs | 1 | 2 | ... | $k_1$ | ... | $k_2$ | ... | $k_M$ |
| --- | --- | --- | --- | --- | --- | --- | --- | --- |
| 1 | ID(1, 1) | ID(1, 2) | ... | ID(1, $k_1$) | ... | 0 | ... | 0 |
| 2 | ID(2, 1) | ID(2, 2) | ... | ID(2, $k_1$) | ... | ID(2, $k_2$) | ... | 0 |
| . | . | . | | . | | . | | . |
| . | . | . | | . | | . | | . |
| . | . | . | | . | | . | | . |
| M | ID(M, 1) | ID(M, 2) | ... | ID(M, $k_1$) | ... | ID(M, $k_2$) | ... | ID(M, $k_M$) |

Table 3 shows an example of IDs ID(s,r) assigned to lines tracks managed for each illuminator.

TABLE 4

| rs | 1 | 2 | ... | $k_1$ | ... | $k_2$ | ... | $k_M$ |
| --- | --- | --- | --- | --- | --- | --- | --- | --- |
| 1 | $\hat{b}_R(1, 1)$ | $\hat{b}_R(1, 2)$ | ... | $\hat{b}_R(1, k_1)$ | ... | 0 | ... | 0 |
| 2 | $\hat{b}_R(2, 1)$ | $\hat{b}_R(2, 2)$ | ... | $\hat{b}_R(2, k_1)$ | ... | $\hat{b}_R(2, k_2)$ | ... | 0 |
| . | . | . | | . | | . | | . |
| . | . | . | | . | | . | | . |
| . | . | . | | . | | . | | . |
| M | $\hat{b}_R(M, 1)$ | $\hat{b}_R(M, 2)$ | ... | $\hat{b}_R(M, k_1)$ | ... | $\hat{b}_R(M, k_2)$ | ... | $\hat{b}_R(M, k_M)$ |

Table 4 shows an example of bistatic range measurement values corresponding to line track IDs managed for each illuminator.

TABLE 5

| rs | 1 | 2 | ... | $k_1$ | ... | $k_2$ | ... | $k_M$ |
| --- | --- | --- | --- | --- | --- | --- | --- | --- |
| 1 | $\hat{b}_V(1, 1)$ | $\hat{b}_V(1, 2)$ | ... | $\hat{b}_V(1, k_1)$ | ... | 0 | ... | 0 |
| 2 | $\hat{b}_V(2, 1)$ | $\hat{b}_V(2, 2)$ | ... | $\hat{b}_V(2, k_1)$ | ... | $\hat{b}_V(2, k_2)$ | ... | 0 |
| . | . | . | | . | | . | | . |
| . | . | . | | . | | . | | . |
| . | . | . | | . | | . | | . |
| M | $\hat{b}_V(M, 1)$ | $\hat{b}_V(M, 2)$ | ... | $\hat{b}_V(M, k_1)$ | ... | $\hat{b}_V(M, k_2)$ | ... | $\hat{b}_V(M, k_M)$ |

Table 5 shows an example of bistatic velocity measurement values corresponding to line track IDs managed for each illuminator.

TABLE 6

| rs | 1 | 2 | ... | $k_1$ | ... | $k_2$ | ... | $k_M$ |
| --- | --- | --- | --- | --- | --- | --- | --- | --- |
| 1 | S(1, 1) | S(1, 2) | ... | S(1, $k_1$) | ... | 0 | ... | 0 |
| 2 | S(2, 1) | S(2, 2) | ... | S(2, $k_1$) | ... | S(2, $k_2$) | ... | 0 |
| . | . | . | | . | | . | | . |
| . | . | . | | . | | . | | . |
| . | . | . | | . | | . | | . |
| M | S(M, 1) | S(M, 2) | ... | S(M, $k_1$) | ... | S(M, $k_2$) | ... | S(M, $k_M$) |

Table 6 shows an example of states for respective line track IDs managed for each illuminator. S(s,r) has any value of 0, 1 and 2 and represents a line track ID state.

In the case of a newly generated line track, a line track ID state S(s,r) has a value of 1. In the case of a line track that is updated and maintained, a line track ID state S(s,r) has a value of 2, and in the case of a deletion candidate track, a line track ID state S(s,r) may have a value of 0.

Line track information classified as shown in Tables 2, 3, 4, 5 and 6 in the line track information combiner 1310 is delivered to the multiple target association unit 1320 and used to generate, update or delete a target track.

Hereinafter, a method of managing a target track in the multiple target association unit 1320 will be described with reference to FIG. 4.

FIG. 4 is a flowchart illustrating an operating method of the multiple target association unit 1320 according to an embodiment.

Referring to FIG. 4, the multiple target association unit 1320 performs a plurality of processing steps for managing target tracks using line track information. When target track information is generated, the multiple target association unit 1320 sequentially assigns target track IDs, and internal information of target tracks are stored in the structure as shown in Table 7.

TABLE 7

| Sequential number | Item | Dimension | Description |
|---|---|---|---|
| 1 | R | [1 × 1] | Number of maintained target tracks |
| 2 | tID | [R × 1] | Target track ID, [tID$_1$, . . . , tID$_R$] |
| 3 | $\hat{x}_t[r']$ | [3 × R] | xyz position coordinate vector of target corresponding to each target track ID [$\hat{x}_t[1]$, . . . , $\hat{x}_t[R]$] |
| 4 | $\hat{v}_t[r']$ | [3 × R] | xyz velocity vector of target corresponding to each target track ID [$\hat{v}_t[1]$, . . . $\hat{v}_t[R]$] |
| 5 | \|L(r')\| | [R × 1] | Number of illuminators associated with target information in bistatic domain corresponding to each target track ID |
| 6 | L(r') | [R × M] | Set of indexes of illuminators in which target information is present in bistatic domain corresponding to each target track ID |
| 7 | $\tilde{J}_M(r')$ | [R × M] | Set of line track IDs of illuminators associated with target information in bistatic domain corresponding to each target track ID |
| 8 | TgTckState | [R × 1] | State of each target track (1: new, 2: updated (maintained), 0: deletion candidate) |
| 9 | C(r') | [R × 1] | Reliability of each target track |
| 10 | $\tilde{x}_t[r']$ | [3 × R] | Next position coordinate vector predicted value of target corresponding to each target track ID [$\tilde{x}_t[1]$, . . . , $\tilde{x}_t[R]$] |
| 11 | $\tilde{v}_t[r']$ | [3 × R] | Next velocity vector predicted value of target corresponding to each target track ID [$\tilde{v}_t[1]$, . . . , $\tilde{v}_t[R]$] |

Table 7 shows an example of a structure constituting internal information of target tracks. The item R of sequential number 1 indicates a total number of target tracks managed at the time in the multiple target association unit 1320, and the item tID of sequential number 2 indicates a target track ID.

The item x$_t$[r'] of sequential number 3 indicates an xyz position coordinate vector of the target at the first time corresponding to each target track ID, and the item $\hat{v}_t$[r'] of sequential number 4 indicates an xyz velocity vector of the target at the second time corresponding to each target track ID.

The item |L(r')| of sequential number 5 indicates the number of illuminators 2000 associated with target information in a bistatic domain corresponding to each target track ID. The item L(r') of sequential number 6 indicates a set of indexes of illuminators in which target information is present in a bistatic domain corresponding to each target track ID. The item J*$_M$(r') of sequential number 7 indicates a set of line track IDs of illuminators associated with target information in a bistatic domain corresponding to each target track ID.

The item TgTckState of sequential number 8 indicates a state of each target track ID. This item indicates a new target track when set to 1, indicates an updated target track when set to 2, and indicates a deletion candidate when set to 0.

The item O(r') of sequential number 9 indicates a reliability value of each target track, and reliability represents whether information of a target track corresponds to a target corresponding to the target track. A method of improving reliability will be described below.

The item $\tilde{x}_t$[r'] of sequential number 10 indicates a position vector predicted value of the second time of a target corresponding to each target track ID, and the item $\tilde{v}_t$[r'] of sequential number 11 indicates a velocity vector predicted value of the second time of the target corresponding to each target track ID.

Referring to FIG. 4, the multiple target association unit 1320 receives classified line track information (S321).

The multiple target association unit 1320 checks presence or absence of target tracks being managed (S322).

Hereinafter, a case in which target tracks being managed are present and a case in which target tracks being managed are not present will be separately described.

First, when target tracks being managed are not present, the multiple target association unit 1320 generates a new target track (S323).

The multiple target association unit 1320 associates a combination with a highest reliability value, among a plurality of combinations having reliability values O(r') respectively, with a new target track to generate a new target track ID tID$_{r'}$ (S323).

The reliability value O(r') may be calculated using FORMULA 5 below.

$$O(r')=p(\hat{b}_R(1,i_1), \ldots, \hat{b}_R(M,i_M), \hat{b}_t(1,i_1), \ldots, \hat{b}_t(M, i_M)) \quad \text{[FORMULA 5]}$$

Here, the function p( ) is a cost function indicating a probability that a bistatic range and a bistatic velocity belonging to an input line track ID set are caused by a specific target.

The multiple target association unit 1320 verifies the generated new target track. The multiple target association unit 1320 combines classified line track information to generate a plurality of combinations and calculates reliability for checking whether the generated combination corresponds to the new target. The multiple target association unit 1320 checks whether the calculated reliability value O(r') exceeds a predetermined threshold value to verity the new target track (S324).

To verify the target track, the multiple target association unit 1320 compares a reliability value O(r') calculated to verify a set J*$_M$(r')={(1,i*$_1$), . . . , (M,i*$_M$)} of line track IDs corresponding to the r'-th target track ID as the multiple targets with a predetermined threshold value.

A combination of classified line track information corresponds to a set of line track IDs and may be represented using FORMULAs 6, 7 and 8.

$$J_M=\{(1,i_1), \ldots, (M,i_M)\}$$

$$\{(s,i_s) \in J_M\} | s=0, 1, \ldots, M, i_s=0, 1, 2, \ldots k_s \quad \text{[FORMULA 6]}$$

Here, J$_M$ indicates a set of line track IDs of all combinations that can be generated based on classified line track information. i$_s$=0 indicates a case in which there is no line track ID to be associated with an object target.

$\mathfrak{J}_M$ is a set of all combinations that can be generated from elements of {(1,i$_1$), . . . , (M,i$_M$)}, and number of cases of all combinations, |$\mathfrak{J}_M$|, may be represented by FORMULA 7.

$$|\mathcal{I}_M| = \sum_{s=1}^{M}(k_s+1) \qquad \text{[FORMULA 7]}$$

$$J_M^*(r') = \operatorname{argmax}_{J_M \in \mathcal{I}_M} C(r') \qquad \text{[FORMULA 8]}$$

Here, $J^*_M(r')$ indicates a set of line track IDs of illuminators associated with target information in a bistatic domain corresponding to each target track ID.

When the reliability value $O(r')$ is larger than the predetermined threshold value, the multiple target association unit 1320 associates the new target track with line track information (S325). To associate the new target track with the line track information, the multiple target association unit 1320 associates a line track ID set $\{ID(1,i^*_1), \ldots, ID(M,i^*_M)\}$ corresponding to $J^*_M(r')$ with the corresponding target track ID.

Thereafter, the multiple target association unit 1320 estimates a position and a velocity of the target using bistatic ranges and bistatic velocities of the line track ID sets, derives an estimated position coordinate vector $\hat{x}_t[r']$ and an estimated velocity vector $\hat{v}_t[r']$ of the target, and generates a list $L(r')$ of illuminators in which the line track ID to be associated is present and the number $|L(r')|$ of illuminators. The list $L(r')$ of illuminators in which the line track ID to be associated is present may be defined as represented by FORMULA 9.

$$L(r')=\{1,\ldots,M\}\cap\{(s,i_s)\in J^*_M(r') \text{ and } i_s\neq 0\} \qquad \text{[FORMULA 9]}$$

Here, $J^*_M(r')$ indicates a set of line track IDs of illuminators associated with target information in a bistatic domain corresponding to each target track ID.

Target track internal information generated by associating the target track with the line track ID set may be stored in the structure for managing target tracks as shown in Table 7.

The multiple target association unit 1320 checks whether target tracks have been generated for all pieces of line track information when the new target track is not verified or after the line track ID set is stored in association with the target track (S326).

When target tracks are not generated for all pieces of line track information, the multiple target association unit 1320 may generate a new target track using line track information other than the line track ID associated with the new target track from among the classified line track information.

Hereinafter, a method of updating or deleting, by the multiple target association unit 1320 according to the embodiment, target track information being managed when target tracks being managed are present will be described in detail.

When one or more target tracks being managed are present, the multiple target association unit 1320 compares line track ID information corresponding to internal information of target track IDs being managed at the first time with line track ID information received at the second time (S327).

To compare the line track ID information corresponding to the internal information of the target track IDs being managed at the first time with the line track ID information received at the second time, the multiple target association unit 1320 checks whether a line track ID set $J^*_M(r')$ corresponding to an r'-th target track ID $tID_{r'}$ is present in the classified line track information. When at least some of the line track ID set J corresponding to the r'-th target track ID $tID_{r'}$ is present in the classified line track information, the multiple target association unit 1320 updates line track information of corresponding target tracks (S328).

When at least some of the line track ID set $J^*_M(r')$ corresponding to the r'-th target track ID $tID_{r'}$ is present in the classified line track information, the multiple target association unit 1320 estimates a position vector $\hat{x}_t[r']$ and a velocity vector $\hat{v}_t[r']$ of a target using bistatic range and bistatic velocity measurement values corresponding to a corresponding line track ID and updates line track ID information in the target track ID $tID_{r'}$ to line track information of the second time.

After target track information update, the multiple target association unit 1320 verifies whether targets corresponding to target tracks before update are the same as targets corresponding to target tracks after update (S329).

After update of the line track information in the target track ID, the multiple target association unit 1320 compares a position vector $\tilde{x}_t[r']$ and a velocity vector predicted value $\tilde{v}_t[r']$ of a target at a fourth time, predicted by the position and velocity predictor 1330 using the target track ID $tID_{r'}$ at a third time, with a position vector $\hat{x}_t[r']$ of a target and a velocity vector $\hat{v}_t[r']$ of the target, measured by the multiple target association unit 1320 using line track IDs at the fourth time, to verify whether the target at the third time is the same as the target at the fourth time.

The third time is prior to the fourth time, and the third time and the fourth time are repeated at specific intervals.

To verify whether the target at the third time is the same as the target at the fourth time, the multiple target association unit 1320 compares a position vector $\tilde{x}_t[r']$ and a velocity vector $\tilde{v}_t[r']$ of the target at the fourth time, which are predicted at the third time, with a position vector $\hat{v}_t[r']$ and a velocity vector $\hat{v}_t[r']$ of the target, which are estimated at the fourth time, using Euclidean distance calculation to verify whether they are the multiple target.

When it is determined that the target corresponding to the target track at the third time is the same as the target corresponding to the line track ID at the fourth time, the line track ID associated with the target track ID $tID_{r'}$ at the third time is associated with the line track ID at the fourth time (S330).

The multiple target association unit 1320 updates the structure constituting the target track ID internal information as shown in Table 7 using the associated line track information.

On the other hand, when it is determined that the target corresponding to the target track at the third time is not the same as the target corresponding to the target track at the fourth time, the multiple target association unit 1320 deletes the corresponding target track after a lapse of predetermined time (S331). That is, the multiple target association unit 1320 deletes the corresponding target track ID $tID_{r'}$. The multiple target association unit 1320 may perform a step of updating the corresponding target track before the lapse of the predetermined time.

After associating the target track with line track ID at the second time or deleting the target track, the multiple target association unit 1320 updates the classified line track information (S332).

To update the classified line track information, the multiple target association unit 1320 deletes the line track information associated with the target track from among the classified line track information generated in the line track information combiner 1310. The multiple target association unit 1320 performs a step of generating a new target track using classified line track information other than the deleted line track information associated with the target track.

The multiple target association unit 1320 checks whether all target tracks being managed at the first time have been updated (S333).

When all target tracks being managed at the first time have not been updated, the multiple target association unit 1320 compares line track information ID corresponding to internal information of target track IDs being managed at the first time with line track ID information received at the second time (S327).

When line track information with respect to all target tracks has been updated, the multiple target association unit 1320 generates a new target track using the updated line track information (S323).

After generation, update and deletion of target tracks in the multiple target association unit 1320, the position and velocity predictor 1330 predicts a position vector and a velocity vector using each piece of target track information. The position and velocity predictor 1330 predicts a position vector and a velocity vector of a target using a signal processing algorithm such as the Kalman filter.

What is claimed is:

1. A passive coherent location (PCL) system comprising:
   a signal measurement device configured to receive a plurality of signals from a plurality of illuminators and generate an In-phase signal and a Quadrature signal corresponding to each of the plurality of illuminators using the plurality of received signals;
   a signal processing device configured to detect a first target using the In-phase signal and the Quadrature signal and measure a bistatic range of the first target and a bistatic velocity of the first target to generate a plurality of pieces of line track information corresponding to the first target; and
   a locating device configured to generate target track information of the first target using the plurality of pieces of line track information and predict a position vector of the first target and a velocity vector of the first target using the target track information,
   wherein the first target includes a plurality of targets.

2. The PCL system of claim 1, wherein the signal measurement device comprises:
   an antenna array configured to receive the plurality of signals; and
   a plurality of signal measurement units configured to generate the In-phase signal and the Quadrature signal corresponding to each of the plurality of illuminators using the plurality of received signals.

3. The PCL system of claim 2, wherein the signal processing device comprises a plurality of signal processors corresponding to the plurality of illuminators, and
   wherein the signal processors are configured to manage the plurality of pieces of line track information.

4. The PCL system of claim 3, wherein the locating device comprises:
   a line track information combiner configured to classify the plurality pieces of line track information based on the plurality of illuminators;
   a multiple target association unit configured to manage the target track information using the classified line track information; and
   a position and velocity predictor configured to predict a position and a velocity of the first target using the target track information.

5. The PCL system of claim 4, wherein the multiple target association unit is configured to generate a plurality of combinations by combining a plurality of pieces of line track information associated with the first target from among the plurality pieces of classified line track information when there is no target track information being managed, calculate reliability values indicating whether the plurality of combinations are information about the first target, and generate the target track information using a combination corresponding to a highest reliability value from among a plurality of reliability values corresponding to the plurality of combinations, and
   wherein the information about the first target is the bistatic range of the first target and the bistatic velocity of the first target.

6. The PCL system of claim 5, wherein the multiple target association unit is configured to associate the target track information with information of the combination corresponding to the highest reliability value when the reliability values are greater than a predetermined threshold value.

7. The PCL system of claim 6, wherein the multiple target association unit is configured to generate new target track information using line track information other than line track information associated with the target track information from among the plurality pieces of the classified line track information.

8. The PCL system of claim 7, wherein, when the target track information being managed is present, the multiple target association unit is configured to compare line track information corresponding to the target track at a first time with the plurality of pieces of line track information at a second time, and when corresponding line track information is present, update target track information at the second time using the corresponding line track information, and
   wherein the first time is prior to the second time, and the first time and the second time are repeated at specific intervals.

9. The PCL system of claim 8, wherein the multiple target association unit is configured to compare a position vector of the first target and a velocity vector of the first target at a fourth time, predicted at a third time, with a position vector of the first target and a velocity vector of the first target, measured at the fourth time, and check whether the first target predicted at the third time is the same as the first target measured at the fourth time,
   wherein a position vector of the first target and a velocity vector of the first target at the third time are configured to be predicted using the target track information,
   wherein a position vector of the first target and a velocity vector of the first target at the fourth time are configured to be calculated using line track information used to update the target track information, and
   wherein the third time is prior to the fourth time, and the third time and the fourth time are repeated at specific intervals.

10. The PCL system of claim 9, wherein, when the first target predicted at the third time is not the same as the first target measured at the fourth time, the multiple target association unit is configured to delete corresponding target track information.

11. The PCL system of claim 10, wherein the multiple target association unit is configured to associate a target track at the third time with a plurality of pieces of line track information corresponding to the first target at the fourth time when the first target predicted at the third time is the same as the first target measured at the fourth time.

12. The PCL system of claim 11, wherein, when the target track managed at the first time is updated, the multiple target association unit is configured to delete line track information associated with the target track from among the plurality pieces of the classified line track information and generate target track information using remaining line track information.

13. The PCL system of claim 12, wherein, when the target track managed at the first time is not updated, the multiple target association unit is configured to compare line track information corresponding to the target track at the first time with the plurality of pieces of line track information at the second time, and when corresponding line track information is present, update target track information at the second time using the corresponding line track information.

14. The PCL system of claim 13, wherein the multiple target association unit is configured to store the target track information as a structure.

* * * * *